(12) United States Patent
Yoshihira et al.

(10) Patent No.: US 10,262,215 B2
(45) Date of Patent: Apr. 16, 2019

(54) SCENE UNDERSTANDING DEVICE

(71) Applicant: Nissan Motor Co., Ltd., Yokohama-shi, Kanagawa (JP)

(72) Inventors: Masanori Yoshihira, Kanagawa (JP); Seigo Watanabe, Kanagawa (JP); Norimasa Kishi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/568,302

(22) PCT Filed: Apr. 23, 2015

(86) PCT No.: PCT/JP2015/062405
§ 371 (c)(1),
(2) Date: Oct. 20, 2017

(87) PCT Pub. No.: WO2016/170646
PCT Pub. Date: Oct. 27, 2016

(65) Prior Publication Data
US 2018/0144201 A1    May 24, 2018

(51) Int. Cl.
*G06K 9/00* (2006.01)
*G06T 7/70* (2017.01)
(Continued)

(52) U.S. Cl.
CPC ......... *G06K 9/00805* (2013.01); *B60R 21/00* (2013.01); *B60W 30/095* (2013.01); *G06K 9/00798* (2013.01); *G06T 7/70* (2017.01); *G08G 1/16* (2013.01); *G08G 1/165* (2013.01); *G08G 1/166* (2013.01); *G06T 2207/30261* (2013.01)

(58) Field of Classification Search
CPC .. G06K 9/00798; G06K 9/00805; G06T 7/70; G06T 2207/30261; G08G 1/165; G08G 1/166; G08G 1/16; B60R 21/00; B60W 30/095
See application file for complete search history.

(56) References Cited

U.S. PATENT DOCUMENTS 9,058,247 B2    6/2015  Fukamachi
9,779,621 B1 *  10/2017 Urmson ............... G08G 1/0141
(Continued)

FOREIGN PATENT DOCUMENTS

EP    2615595 A1    7/2013
EP    2615596 A1    7/2013
(Continued)

*Primary Examiner* — Khoi H Tran
*Assistant Examiner* — Robert T Nguyen
(74) *Attorney, Agent, or Firm* — Young Basile Hanlon & MacFarlane, P.C.

(57) ABSTRACT

A scene understanding device obtains map data where one, two or more obstacle detection frames, shaped corresponding to a road structure, for detecting an obstacle are set in advance for a specific spot on a road where a vehicle would otherwise bump into a vehicle or a pedestrian. The scene understanding device determines whether there exists an obstacle in the obstacle detection frames set for the specific spot on a scheduled traveling route of a host vehicle, and calculates the degree of risk at the specific spot based on a result of determining whether there exists an obstacle therein.

7 Claims, 14 Drawing Sheets

(51) Int. Cl.
G08G 1/16 (2006.01)
B60R 21/00 (2006.01)
B60W 30/095 (2012.01)

(56) References Cited

U.S. PATENT DOCUMENTS

| | | | |
|---|---|---|---|
| 2002/0036584 A1* | 3/2002 | Jocoy | G01S 13/931 |
| | | | 342/70 |
| 2003/0065429 A1 | 4/2003 | Yamamoto et al. | |
| 2008/0291000 A1 | 11/2008 | Kim et al. | |
| 2010/0100325 A1 | 4/2010 | Lovell et al. | |
| 2012/0323479 A1 | 12/2012 | Nagata | |
| 2013/0060548 A1 | 3/2013 | Shimizu | |
| 2013/0204516 A1* | 8/2013 | Fukamachi | G08G 1/166 |
| | | | 701/300 |
| 2013/0342698 A1 | 12/2013 | Thompson | |
| 2016/0161270 A1* | 6/2016 | Okumura | G01C 21/34 |
| | | | 701/23 |
| 2016/0176399 A1* | 6/2016 | Takagi | G08G 1/166 |
| | | | 701/301 |
| 2017/0308760 A1* | 10/2017 | Kwon | G06T 7/11 |
| 2018/0253647 A1* | 9/2018 | Yu | G06N 3/082 |

FOREIGN PATENT DOCUMENTS

| | | | |
|---|---|---|---|
| JP | 2003337993 A | 11/2003 | |
| JP | 2006154967 A | 6/2006 | |
| JP | 2007336466 A | 12/2007 | |
| JP | 2011150633 A | 8/2011 | |
| JP | 2012038138 A | 2/2012 | |
| JP | 2015072650 A | 4/2015 | |
| WO | 2011101988 A1 | 8/2011 | |
| WO | 2011141984 A1 | 11/2011 | |
| WO | 2012032624 A1 | 3/2012 | |
| WO | 2014119196 A1 | 8/2014 | |

* cited by examiner

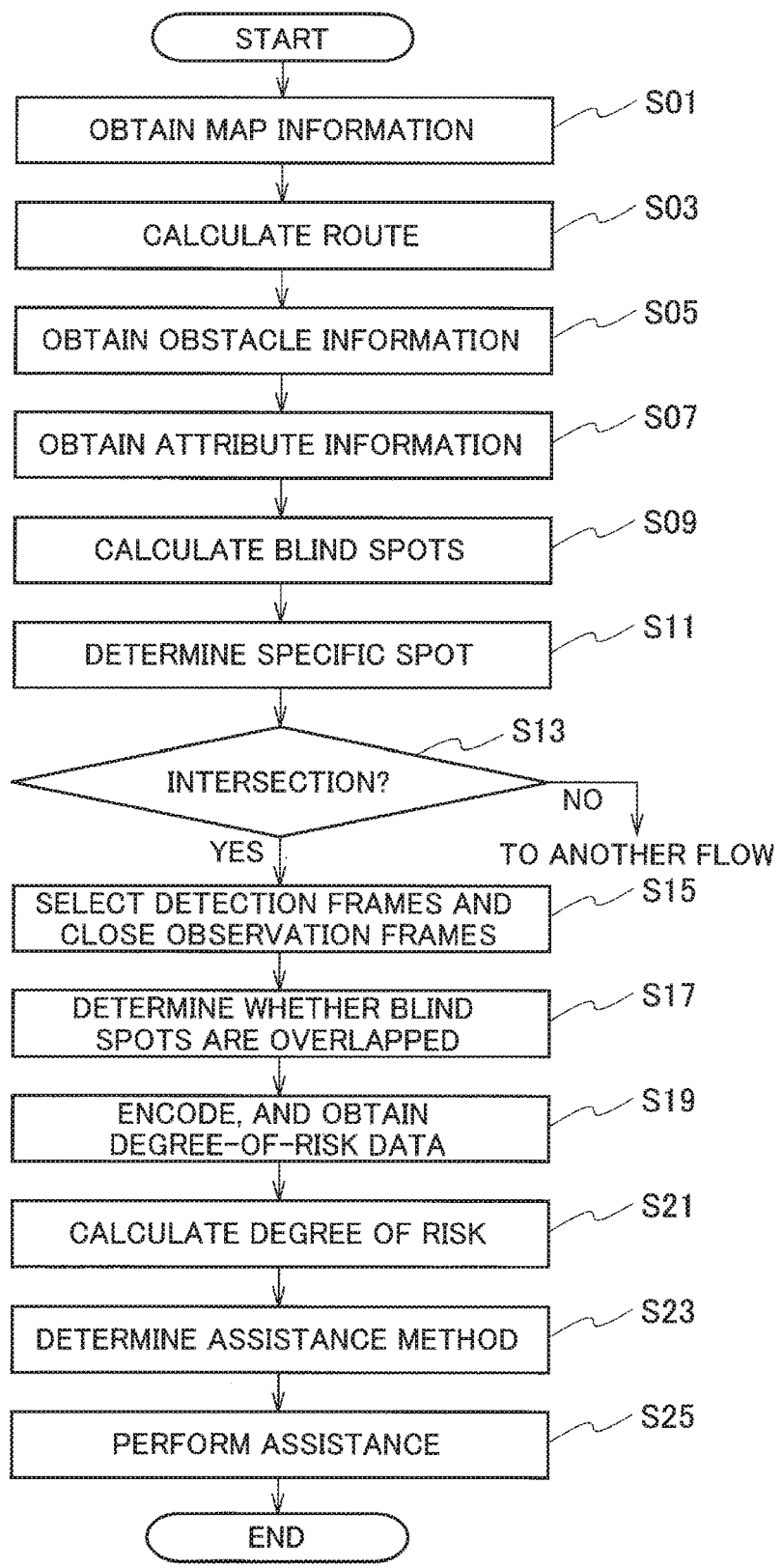

●--→● ROAD NETWORK

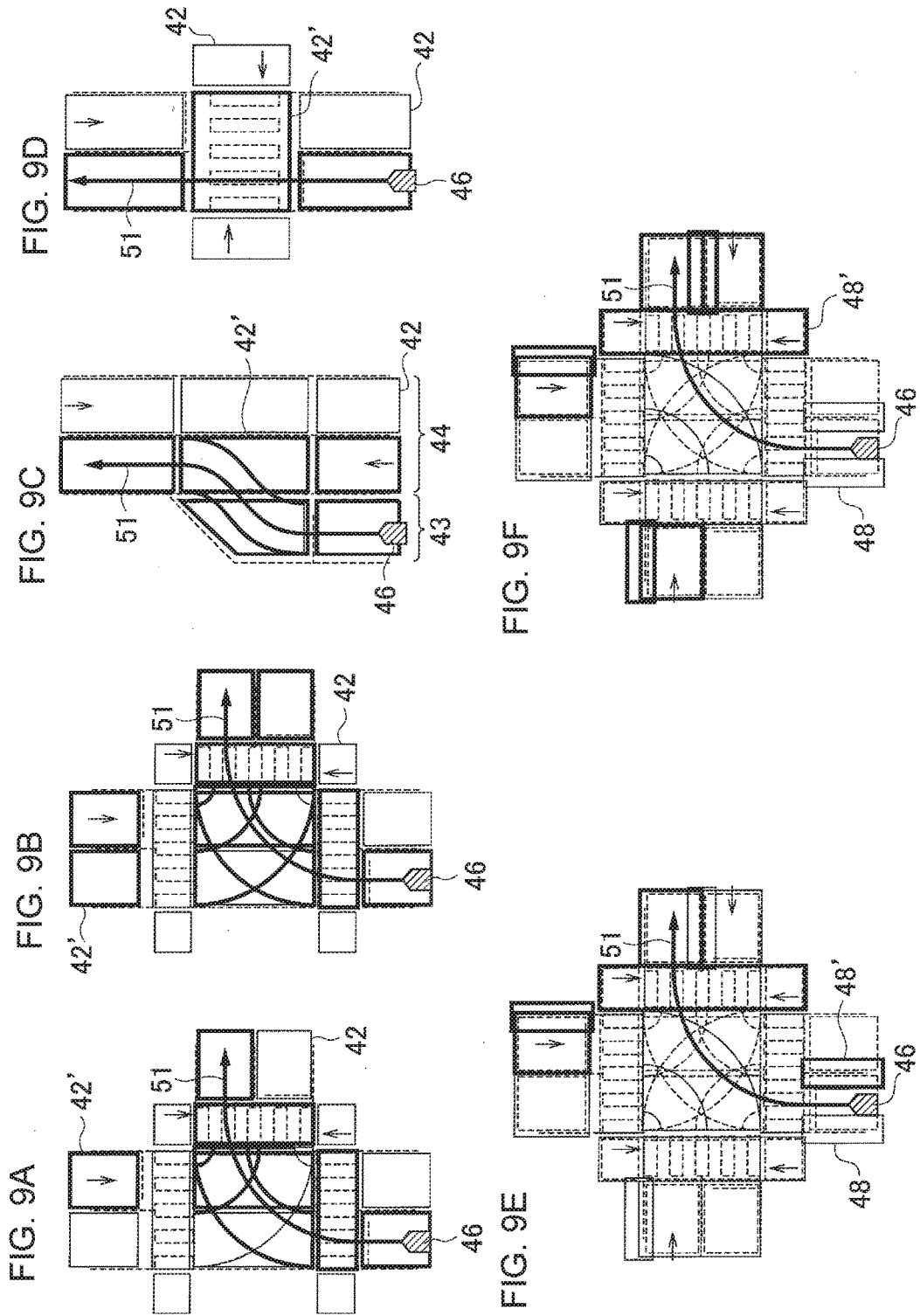

US 10,262,215 B2

SCENE UNDERSTANDING DEVICE

TECHNICAL FIELD

The present invention relates to a scene understanding device that determines the degree of risk at a specific spot on a road where a vehicle would otherwise bump into another vehicle or a pedestrian.

BACKGROUND

A degree-of-risk calculation apparatus for calculating the degree of potential risk around a host vehicle has been proposed (see International Publication No. 2012/032624). According to International Publication No. 2012/032624, based on information from an obstacle detection device, the degree-of-risk calculation apparatus changes the mesh setting for gridded areas around the host vehicle, and thereby calculates the risk potentials respectively for the intersections, or in the gridded areas, in the mesh. Accordingly, based on the thus-calculated risk potentials, the degree-of-risk calculation apparatus sets the target route of the host vehicle.

Since the risk potentials are calculated respectively for all the gridded areas around the host vehicle, a problem arises in which when many obstacles are detected, the arithmetic load increases, and it takes longer to calculate the degree of risk.

SUMMARY

In view of the above problem, the preset invention has been made, and an object thereof is to provide a scene understanding device which inhibits an excessive increase in the arithmetic load.

The scene understanding device according to an aspect of the present invention determines whether there exists an obstacle in obstacle detection frames which are set in advance for a specific spot where a vehicle would otherwise bump into another vehicle or a pedestrian, and which are shaped corresponding to a road structure. Thus, based on a result of the determination, the scene understanding device calculates the degree of risk at the specific spot.

BRIEF DESCRIPTION OF THE DRAWINGS

FIG. 2 is a block diagram showing multiple processing circuits configured by an arithmetic circuit 17a;

FIG. 3 is a flowchart showing an example of a driving assistance method including a scene understanding method of the first embodiment;

FIGS. 9(a) to 9(d) are plan views showing examples of an obstacle detection frame 42' to be selected by a detection frame selector 25;

FIGS. 9(e) and 9(f) are plan views showing examples of a close observation frame 48' to be selected by a detection frame selector 25;

DETAILED DESCRIPTION OF THE EMBODIMENTS

Figure 1:
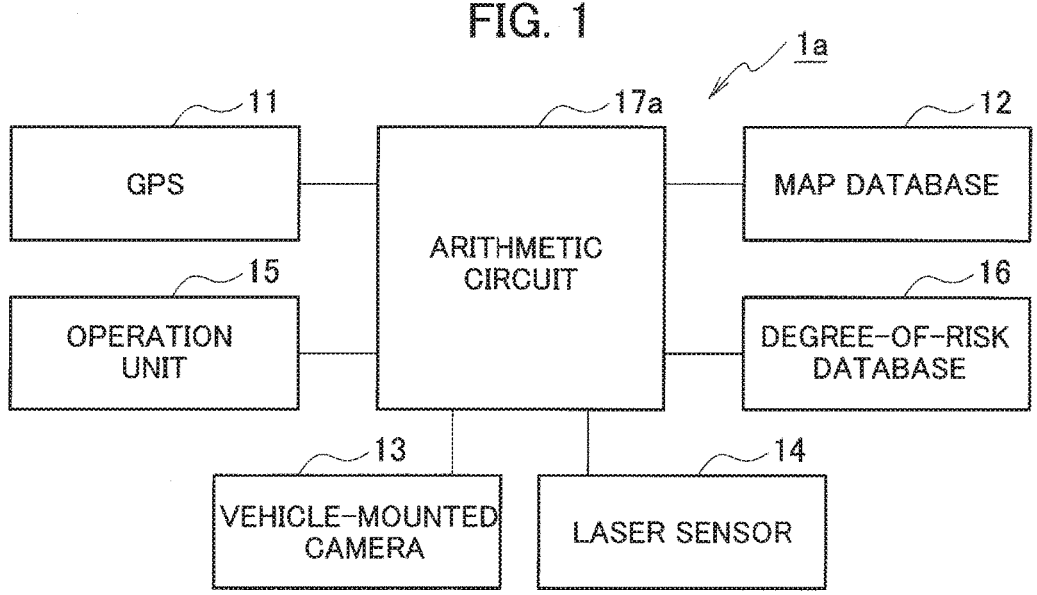
FIG. 1 is a block diagram showing an overall configuration of a driving assistance apparatus 1a including a scene understanding device of a first embodiment.

Next, referring to the drawings, detailed descriptions will be provided for embodiments of the present invention.

First Embodiment

Referring to FIG. 1, descriptions will be provided for an overall configuration of a driving assistance apparatus 1a including a scene understanding device in the first embodiment. The driving assistance apparatus 1a is an apparatus which performs driving assistance by determining how to run a host vehicle (a driving assistance method) based on a degree of risk (a scene) of collision between the host vehicle and another vehicle or a pedestrian at a specific spot on its scheduled traveling route. The scene understanding device is a device which calculates the degree of risk, or understands the scene. The specific spot is a spot on a road where a vehicle would otherwise bump into another vehicle or a pedestrian. Examples of the specific spot include an intersection where three or more roads meet, an interchange of an expressway, and a pedestrian crossing. Accordingly, when the host vehicle runs at the specific spot, the scene understanding device detects other vehicles or pedestrians at and around the specific spot, and calculates a risk of collision between the host vehicle and another vehicle or a pedestrian. Thus, in order to enable the host vehicle to run through the specific spot safely, the driving assistance apparatus 1a determines how to run the host vehicle (the driving assistance method) based on the degree of risk, and thereby performs the driving assistance.

The driving assistance apparatus 1a includes a GPS 11, a map database 12, a vehicle-mounted camera 13, a laser sensor 14, an operation unit 15, a degree-of-risk database 16, and an arithmetic circuit 17a. The GPS 11 is an example of a vehicle position detector that detects a current position of the host vehicle. The map database 12 is an example of a map storage for storing map data. The vehicle-mounted camera 13 and the laser sensor 14 are examples of an obstacle detector that detects positions of obstacles present around the vehicle. The operation unit 15 is a member for receiving instructions from the driver of the host vehicle, and includes a microphone, a touch panel arranged on an instrument panel, and a steering switch. The degree-of-risk database 16 stores relationships between combinations of obstacle detection frames including obstacles and degrees of risk. The degree-of-risk database 16 and obstacle detection frames will be described later.

The arithmetic circuit 17a is a circuit which performs a series of arithmetic processes for: calculating a degree of risk using obstacle information and map information; and thereby performing driving assistance. The arithmetic circuit 17a is, for example, a general-purpose microcomputer including a CPU, a RAM, a ROM, a memory and an input/output control circuit. A computer program in which the series of arithmetic processes is described is installed in the microcomputer in advance. Executing the computer program, the microcomputer constructs multiple processing circuits for executing the above-mentioned series of arithmetic processes. The multiple processing circuits constructed by the arithmetic circuit 17a are described later by reference to FIG. 2.

The GPS 11 measures the position of the host vehicle in real time by receiving electric waves from the NAVSTAR satellites in the Global Positioning System. For each specific spot, one, two or more obstacle detection frames, shaped corresponding to the structure of a road, for detecting obstacles are set in advance in the map data stored in the map database 12. The vehicle-mounted camera 13 is mounted on the host vehicle, and obtains ambient images by shooting the surroundings of the host vehicle. The arithmetic circuit 17a analyzes the ambient images, and thereby determines whether there exists an obstacle around the host vehicle, and where an obstacle, if any, is located. The laser sensor 14 emits pulses of laser light, detects light reflected from the obstacle, thereby detecting the distance from the host vehicle to the obstacle, and the azimuth of the obstacle relative to the host vehicle.

Figure 2:
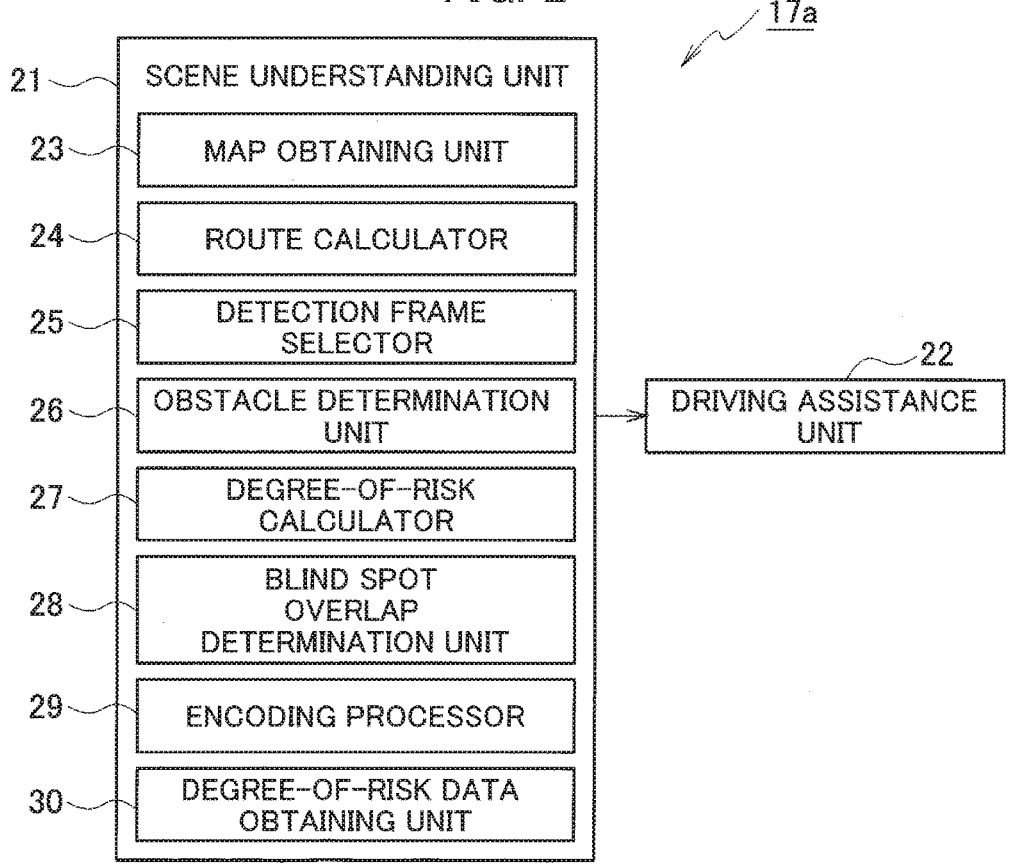

Referring to FIG. 2, descriptions will be provided for the multiple processing circuits constructed by the arithmetic circuit 17a. As the multiple processing circuits, the arithmetic circuit 17a includes a scene understanding unit 21 for determining a driving assistance method by the calculating the degree of risk, and a driving assistance unit 22 for performing the determined driving assistance. The scene understanding unit 21 includes a map obtaining unit 23, a route calculator 24, a detection frame selector 25, an obstacle determination unit 26, a degree-of-risk calculator 27, a blind spot overlap determination unit 28, an encoding processor 29, and a degree-of-risk data obtaining unit 30.

The driving assistance unit 22 performs the driving assistance in accordance with how to run the host vehicle (the driving assistance method), which is determined by the scene understanding unit 21. To put it specifically, the driving assistance may be an autonomous driving control in which the driving assistance apparatus 1a autonomously performs all the driving operation, including steering operation and pedal operation, by driving various actuators. Otherwise, the driving assistance may be one in which through the driver's five senses such as hearing, sight and touch, the driving assistance apparatus 1a gives the driver instructions, suggestions or hints as to how the driver should perform driving operation.

The route calculator 24 calculates a scheduled traveling route from the current position of the host vehicle measured by the GPS 11 to a destination received by the operation unit 15. Incidentally, the embodiment will describe a case where the driving assistance apparatus 1a or the scene understanding device has a function of autonomously doing the arithmetic on the scheduled traveling route. However, the driving assistance apparatus 1a or the scene understanding device may obtain a scheduled traveling route calculated by a difference device from the outside.

Figure 4A:
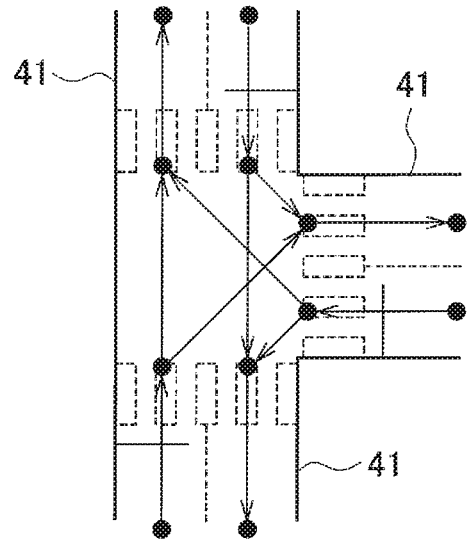
FIG. 4(a) is a plan view showing an example of curb information on where curbs 41 are in a three-way junction or road network information on the three-way junction.

The map obtaining unit 23 obtains map data on the scheduled traveling route from the map database 12. The map obtaining unit 23 reads specific spots on the scheduled traveling route, and the obstacle detection frames set for each specific spot. A digital map may be used as the map data. The digital map includes curb information on where a curb 41 is located, or road network information shown in FIG. 4(a). The curb information is used to calculate a travelable area of the host vehicle. The road network information is used to obtain an area where the host vehicle will be able to travel at the next point of time. The digital map further includes information on obstacle detection frames which are shaped corresponding to the structure of the road.

Although the embodiment shows the case where the map database 12 is provided onboard the vehicle, the map database 12 is not limited to this. The map database 12 may be stored in a server outside the vehicle. In this case, the map obtaining unit 23 may obtain the map data from the outside of the vehicle via a network. This is also the case with the degree-of-risk database 16. Furthermore, the obstacle detection frames may be set on the map database 12 from the beginning.

Figure 4B:
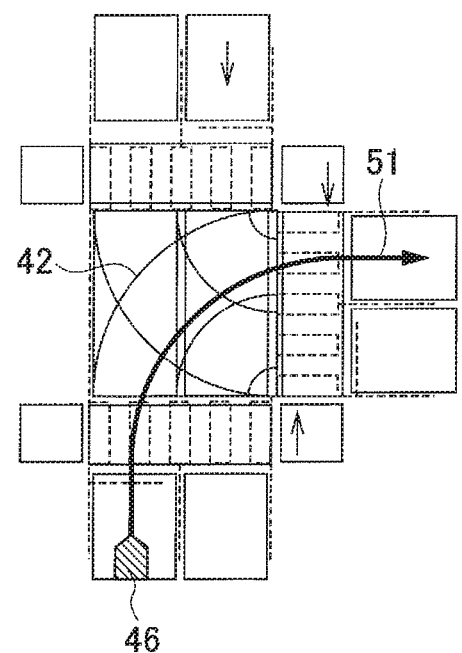
FIG. 4(b) is a plan view showing examples of an obstacle detection frame 42 to be set for the three-way junction.

As shown in FIG. 4(b), multiple obstacle detection frames 42 shaped corresponding to the structure of the road are set for one specific point (for example, a three-way junction). The obstacle detection frames 42 are set for the entrances to and the exits from the intersection, the inside of the intersection, the pedestrian crossings, the sidewalk portions connected adjacent to the pedestrian crossings, and the like. Inside the intersection, the obstacle detection frames 42 are set for the straight-ahead, right-turn and left-turn routes passing through the intersection.

Figure 5A:
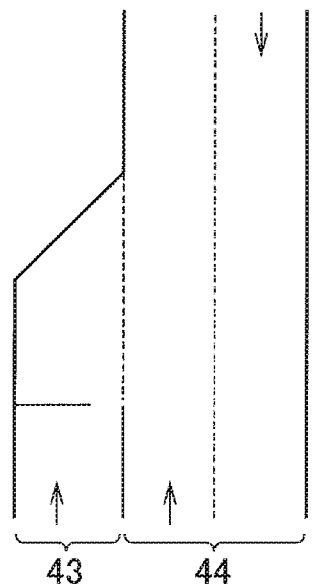
FIG. 5(a) is a plan view showing an example of a junction.
Figure 5B:
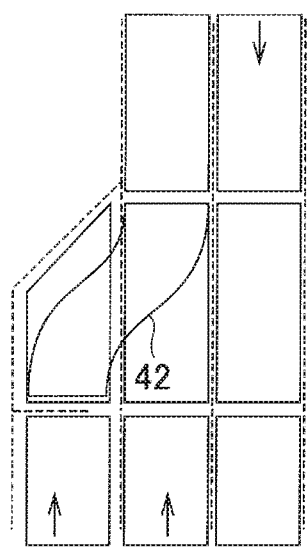
FIG. 5(b) is a plan view showing examples of the obstacle detection frame 42 to be set for the junction.
Figure 5C:
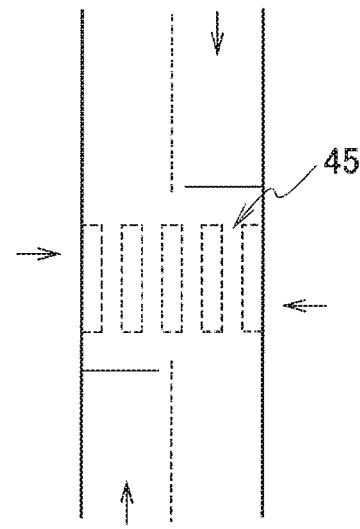
FIG. 5(c) is a plan view showing an example of a pedestrian crossing 45.
Figure 5D:
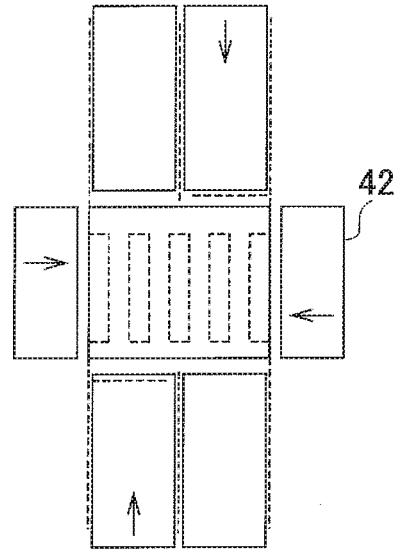
FIG. 5(d) is a plan view showing examples of the obstacle detection frame 42 to be set for the pedestrian crossing 45.

Another example of a specific spot where a vehicle would otherwise bump into another vehicle is a merging point where, as shown in FIGS. 5(a) and 5(b), a merging lane 43 (including a branch lane) merges into a through traffic lane 44. An example of a specific spot where a vehicle would otherwise bump into a pedestrian is a pedestrian crossing 45, as shown in FIGS. 5(c) and 5(d). In these specific spots, too, multiple obstacle detection frames 42 are set for the preencounter traffic (scene entrance), the encounter traffic (scene inside), and the post-encounter (scene exit).

The obstacle determination unit 26 determines whether there exists an obstacle in the obstacle detection frames set for the specific spot on the scheduled traveling route. The obstacle determination unit 26 determines whether the location of an obstacle detected by the vehicle-mounted camera 13 and the laser sensor 14 falls within the obstacle detection frames.

The degree-of-risk calculator 27 calculates the degree of risk at the specific spot based on a result of determining whether there exists an obstacle. A specific method of calculating the degree of risk will be described later, but is not limited to descriptions which will be provided for the method later. An already-known method (for example, a method recited in Patent Literature 1) may be used depending on the necessity.

From the curb information or the road network information, the scene understanding unit 21 obtains a running area where the host vehicle will run from now. In a case where a specific spot is included in the running area, the scene understanding unit 21 reads the obstacle detection frames set for the specific spot. An obstacle is detected using the external sensing devices (the vehicle-mounted camera 13 and the later sensor 14) mounted on the vehicle. The scene understanding unit 21 determines whether the detected obstacle is included in the obstacle detection frames. In a case where the obstacle exists in the predetermined obstacle detection frames set for the specific spot, the scene understanding unit 21 determines that the specific spot is dangerous. The degree of risk may be set for each obstacle detection frame, and may be set differently for each obstacle detection frame. In other words, when the degree of risk is calculated, the degree of risk is differently weighted for each obstacle detection frame.

As described above, the scene understanding unit 21 calculates the degree of risk at the specific spot based on whether there exists an obstacle in the obstacle detection frames 42 set in advance in the map data. Thereby, obstacles which are detected at positions having nothing to do with the calculation of the degree of risk can be excluded from what the scene understanding unit 21 processes. Accordingly, it is possible to inhibit an excessive increase on the arithmetic load.

In the map data stored in the map database 12, not only the obstacle detection frames, but also close observation frames to be closely observed from a viewpoint of whether the close observation frames overlap blind spots caused by obstacles may be set in advance for each specific spot. In this case, the map obtaining unit 23 obtains the map data where the close observation frames are set in advance for the specific spot. As shown in FIG. 2, the scene understanding unit 21 further includes the blind spot overlap determination unit 28 that determines whether blind spots caused by obstacles overlap the close observation frames. Based on a result of determining whether blind spots caused by obstacles overlap the close observation frames, the degree-of-risk calculator 27 calculates the degree of risk at each specific spot. This makes it possible to calculate the degree of risk at the specific spot on the assumption that there exist obstacles in blind spots.

A close observation frame 48 is set for a place where a blind spot is likely to occur due to the existence of another vehicle, a building or a wall. Furthermore, a close observation frame 48 is set for a place which will be dangerous when another vehicle or a pedestrian comes out of a blind spot. A place with which to provide a close observation frame 48 varies depending on the route of the host vehicle 46 and the direction in which the host vehicle 46 approaches the specific spot. Even in a case where the host vehicle approaches the same specific spot after travelling the same route, places with which to provide a close observation frame and the number of close observation frames may vary depending on cases. For example, the number of close observation frames needed for a specific spot varies depending on whether there are traffic lights in the specific spot.

Figure 6A:
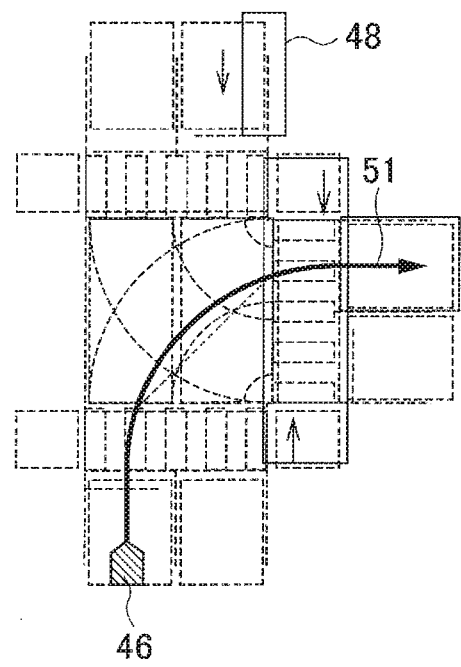
FIG. 6(a) is a plan view showing examples of a close observation frame 48 to be set for a three-way junction with traffic lights.

FIG. 6(a) shows examples of the close observation frame 48 to be set for a three-way junction with traffic lights. When there exists another vehicle at the entrance to the opposing lane, the bike lane at the side of the vehicle is likely to fall into a blind spot. When a vehicle running ahead is inside the intersection, a blind spot is likely to occur on and near the pedestrian crossing, as well as at and near the exit from the lane on which the host vehicle is running. For these reason, the close observation frame 48 is set for these places which are likely to fall into a blind spot.

Figure 6C:
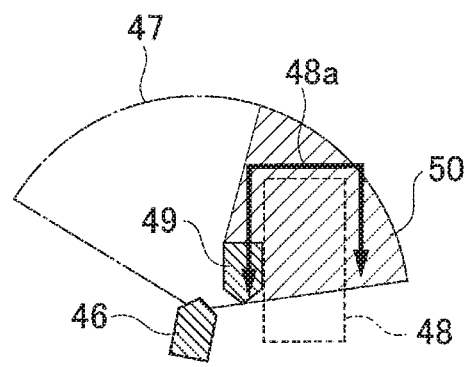
FIG. 6(c) is a plan view showing how a blind spot caused by an obstacle 49 and a close observation frame 48 overlap each other.
Figure 6B:
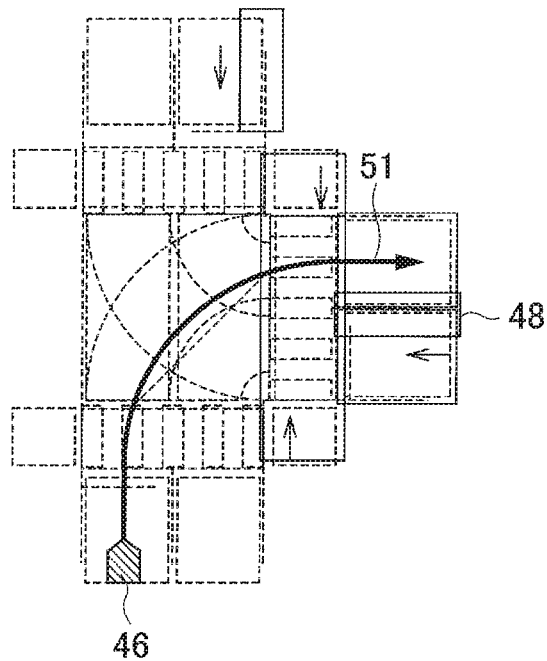
FIG. 6(b) is a plan view showing examples of the close observation frame 48 to be set for a three-way junction without traffic lights.

FIG. 6(b) shows examples of the close observation frame 48 to be set for a three-way junction without traffic lights. A scene in which another vehicle enters the intersection from another road crossing the road on which the host vehicle 46 is running needs to be taken into consideration to calculate the degree of risk. When a vehicle running ahead is inside the intersection, a blind spot is likely to occur on and near the pedestrian crossing, as well as at and near the exit from. A blind spot is likely to occur at the entrance to the opposing lane in another road due to a vehicle running ahead. For this reason, the close observation frame 48 is set for the entrance to the opposing lane in another road.

The degree-of-risk calculator 27 calculates the degree of risk from how much of a blind spot 50 obtained by the sensor attached to the host vehicle 46 overlaps a close observation frame 48. For example, the degree-of-risk calculator 27 calculates the degree of risk from a proportion of the area where the blind spot and the close observation frame 48 overlap each other to the area of the close observation frame 48. Otherwise, the degree-of-risk calculator 27 may calculate the degree of risk from a proportion of the length 48a of the close observation frame 48 overlapping the blind spot to the outer circumference of the close observation frame 48. The degree-of-risk calculator 27 is capable of calculating a higher degree of risk when a value representing how much of the blind spot 50 obtained by the sensor attached to the host vehicle 46 overlaps the close observation frame 48 is greater than a reference value, because the higher value means a worse visibility.

Figure 7A:
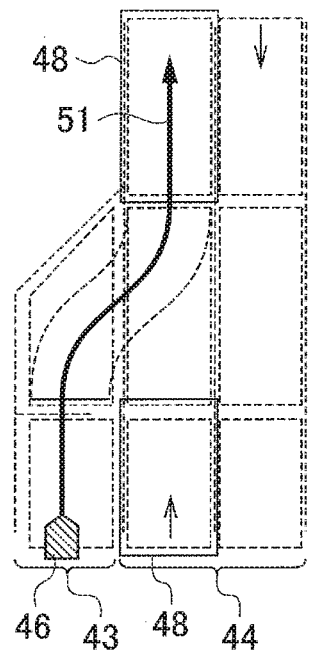
FIG. 7(a) is a plan view showing examples of the close observation frame 48 to be set for a junction.

In a case where as shown in FIG. 7(a), there is a wall between a merging lane 43 and a through-traffic lane 44 at a merging point, the area behind the wall is likely to fall into a blind spot. Furthermore, in a case where a vehicle running ahead is changing lanes from the merging lane 43 to the through-traffic lane 44, a blind spot is likely to occur in and near an area beyond a place where the vehicle merges into the through-traffic lane 44 are likely to fall into a blind spot. For these reasons, the close observation frame 48 is set for these places which are likely to fall in a blind spot. Incidentally, when the host vehicle 46 enters the through-traffic lane 44 from the merging lane 43, multiple close observation frames 48 are set. However, in a case where the host vehicle 46 only runs straight ahead in the through-traffic lane 44 to which the right of way is given over the merging lane 43, no close observation frame is provided.

Figure 7B:
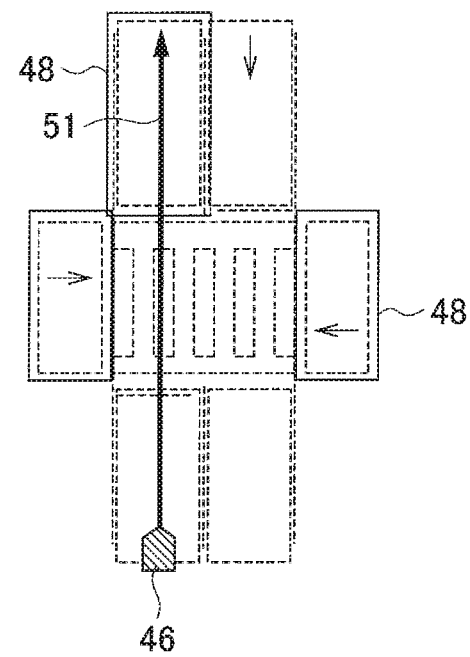
FIG. 7(b) is a plan view showing examples of close observation frame 48 to be set for a pedestrian crossing.
Figure 8A:
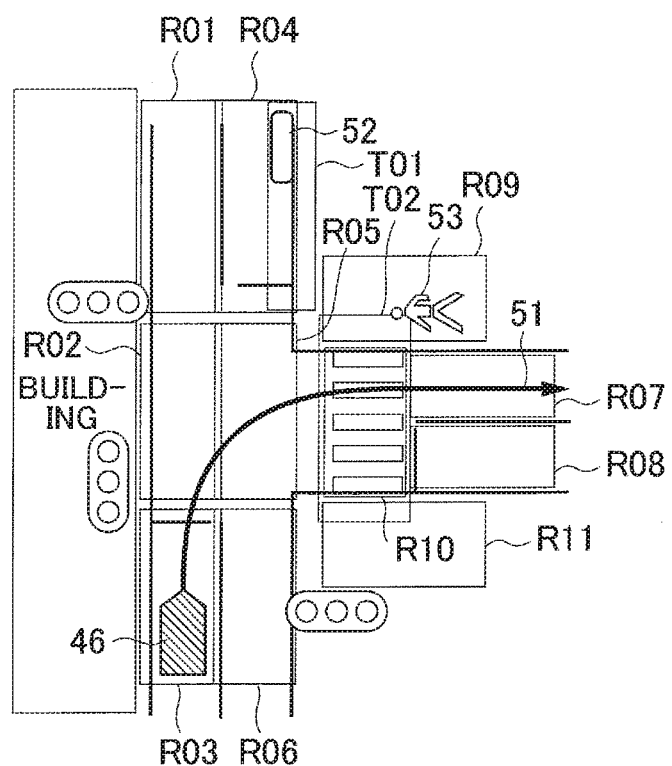
FIG. 8(a) is a plan view showing a three-way junction for which 11 obstacle detection frames (R01 to R11) and two close observation frames (T01, T02) are set.
Figure 8B:
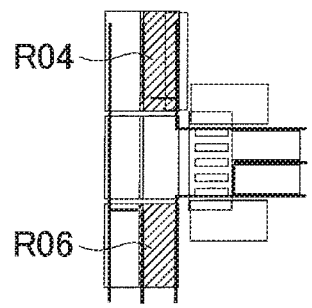
FIGS. 8(b) to 8(e) are plan views showing examples of how to combine the obstacle detection frames (R01 to R11) including obstacles with the close observation frames (T01, T02) overlapping blind spots for the three-way junction shown in FIG. 8(a)
Figure 8C:
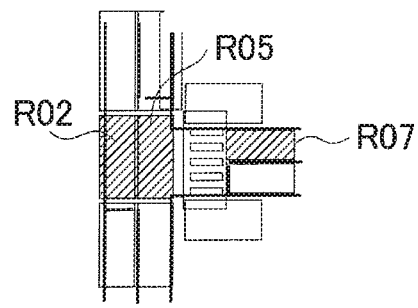
Figure 8D:
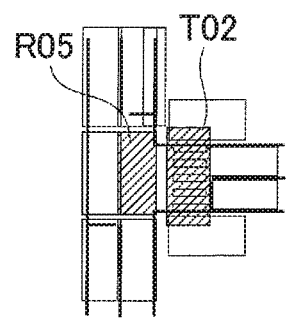
Figure 8E:
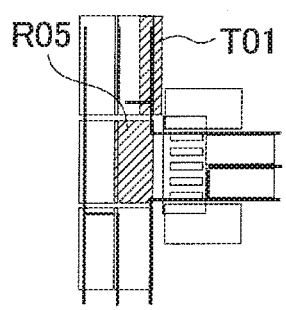

In a case where as shown in FIG. 7(b), a vehicle running ahead is on a pedestrian crossing, a place at the side of the pedestrian crossing is likely to fall into a blind spot. Furthermore, in a case where a pedestrian is walking on the pedestrian crossing, a place behind the pedestrian is likely to fall into a blind spot. For these reasons, the close observation frame 48 is provided for these places which are likely to fall into a blind spot.

In the first embodiment, based on combinations of the obstacle detection frames 42 including obstacles, the degree-of-risk calculator 27 calculates the degree of risk at the specific spot. Since the degree-of-risk calculator 27 need not calculate the degree of risk for each obstacle detection frame 42, it is possible to inhibit an excessive increase in the arithmetic load. Furthermore, the degree-of-risk calculator 27 may calculate the degree of risk at the specific spot by adding the close observation frames 48 overlapping the blind spots caused by the obstacles to the combinations of the obstacle detection frames 42.

As discussed above, multiple obstacle detection frames 42 and multiple close observation frames 48 are set for one specific spot. The degree-of-risk calculator 27 determines whether a traffic condition set in advance can be read from the combinations of the multiple obstacle detection frames 42 from which the obstacles are detected and the multiple close observation frames 48 overlapping the blind spots. Only if the traffic condition set in advance can be read, the degree-of-risk calculator 27 calculates the degree of risk based on the traffic condition. In a case where the traffic condition set in advance can be read while the host vehicle is running, the degree of risk calculator 27 recognizes the environment to be encountered by the host vehicle as being a dangerous scene.

In this respect, the degree of risk is determined using the combinations of the obstacle detection frames 42 including the obstacles and the close observation frames 48 overlapping the blind spots. Nevertheless, the degree of risk may be determined by: calculating the degrees of risk for the respective obstacle detection frames 42 and the degrees of risk for the respective close observation frames 48; and adding up these degrees of risk.

FIG. 8(*a*) shows a three-way junction for which 11 obstacle detection frames (R01 to R11) and two close observation frames (T01, T02) are set. As a scheduled traveling route 51, the host vehicle 46 turns left at the three-way junction. FIGS. 8(*b*) to 8(*e*) show examples of how to combine the obstacle detection frames 42 including the obstacles with the close observation frames 48 overlapping the blind spots for the three-way junction shown in FIG. 8(*a*). The obstacle detection frames 42 including the obstacles and the close observation frames 48 overlapping the blind spots are hatched. In an example of FIG. 8(*b*), obstacles are detected in obstacle detection frames (R04, R06) set for: the entrance to the intersection from the opposing lane and its vicinity; and the exit from the intersection to the opposing lane and its vicinity. From a combination of the obstacle detection frames (R04, R06), the degree-of-risk calculator 27 can read the traffic condition as traffic being congested on the opposing lane. In an example of FIG. 8(*c*), obstacles are detected in obstacle detection frames (R02, R05, R07) set for the inside of the intersection, as well the exit from the intersection for the host vehicle and its vicinity. From a combination of the obstacle detection frames (R02, R05, R07), the degree-of-risk calculator 27 can read the traffic condition as traffic being congested with vehicles waiting in the intersection to turn right because other vehicles stay on the lane to which they are going to turn right.

In an example of FIG. 8(*d*), an obstacle is detected in an obstacle detection frame (R05) set for the inside of the intersection in front of the pedestrian crossing. In addition, a close observation frame (T02) on and near the pedestrian crossing at the exit from the intersection for the host vehicle overlaps a blind spot. From a combination of the obstacle detection frame (R05) and the close observation frame (T02), the degree-of-risk calculator 27 can read the traffic condition as another vehicle stopping in front of the pedestrian crossing because there are pedestrians 53 on the pedestrian crossing, or the pedestrian crossing being invisible because the obstacle exists in front of the pedestrian crossing.

In an example of FIG. 8(*e*), an obstacle is detected in an obstacle detection frame (R05) set for the inside of the intersection on the opposing lane. In addition, a close observation frame (T01) set for an entrance to the intersection from the opposing lane overlaps a blind spot. From a combination of the obstacle detection frame (R05) and the close observation frame (T01), the degree-of-risk calculator 27 can read the traffic condition as the side road at the side of the entrance to the intersection from the opposing lane being invisible because another vehicle exists inside the intersection on the opposing lane. Thereby, the degree-of-risk calculator 27 can determine a risk that a bike 52 may exist in the side road at the side of the entrance to the intersection from the opposing lane.

As shown in FIG. 1, the scene understanding device of the first embodiment includes the degree-of-risk database 16. The combinations of the obstacle detection frames 42 including the obstacles are encoded. The degree-of-risk database 16 stores relationships between the encoded combinations and the degrees of risk. The scene understanding unit 21 includes the encoding processor 29 that encodes the combinations of the obstacle detection frames including the obstacles. Using the degree-of-risk database 16, the degree-of-risk calculator 27 calculates the degree of risk at the specific spot from the combinations encoded by the encoding processor 29. The encoding makes it possible to inhibit the increase in the arithmetic load more. Incidentally, it is a matter of course that the close observation frames 48 overlapping the blind spots may be added to the encoded combinations.

The encoding is a method of representing information on the degrees of risk which is based on a high-speed information process to be performed by a computer using bit strings. Results of scene understanding using the multiple obstacle detection frames and the multiple close observation frames are used for the encoding. How to associate the combinations with the degrees of risk is based on past accident cases, and past incident cases (near-accident cases which would have naturally resulted in major disasters or accidents although actually not). The degree-of-risk database 16 stores the past accident cases as digitized using the encoding technique.

For example, each combination of the obstacle detection frames 42 including the obstacles with the close observation frames 48 overlapping the blind spot is represented by a series of digits. The combinations shown in FIGS. 8(*b*) to 8(*e*) are encoded and associated with the corresponding degrees of risk, and are stored in the degree-of-risk database 16. The result of encoding the combination shown in FIG. 8(*b*) is "0001010000000." The result of encoding the combination shown in FIG. 8(*c*) is "010010001000." The result of encoding the combination shown in FIG. 8(*d*) is "0000100100001." The result of encoding the combination shown in FIG. 8(*e*) is "0000100100010."

The degree-of-risk calculator 27 compares the combinations of the obstacle detection frames and the close observation frames, which are encoded by the encoding processor 29, with the encoded combinations stored in the degree-of-risk database 16, and thereby calculates the degree of risk which corresponds to the combinations of the obstacle detection frames and the close observation frames.

Furthermore, in order to expand the scope of what can be represented by digits in the encoding, not only whether there exist obstacles and blind spots, but also attribute information on obstacles themselves may be represented by digits. The obstacle determination unit 26 may be configured to detect the attributes of the obstacles existing in the obstacle detection frames 42 set for the specific spot on the scheduled traveling route 51. The encoding processor 29 encodes the combinations of the obstacle detection frames 42 including the obstacles and the attributes of the obstacles. Since the attribute information on the obstacles is taken into consideration, the accuracy of the calculation of the degrees of risk is improved. It is a matter of course that the close observation frames 48 overlapping the blind spots may be added to these combinations.

As a method of representing the attribute of each obstacle using digits, bit strings representing the combinations may be increased in numbers by encoding the attribute thereof with the binary-bit representation using 0 and 1. The attribute information includes physical information and characteristic information. Examples of the physical information include: information on vehicle specifications including the weights and sizes of vehicles; and information on types of obstacles (a pedestrian, a bicycle and a four-wheeler). Examples of the characteristic information include: information on whether each obstacle is static or in motion; and motion information such as on how each obstacle, if in motion, is moving.

The first embodiment has shown the case where, as shown in FIGS. 4 to 7, the degree of risk is calculated using all of the obstacle detection frames 42 and the close observation frames 48 set in advance for each specific spot. However, the embodiment is not limited to this. For example, the embodiment may be such that: obstacle detection frames 42' are selected from the obstacle detection frames 42 set in advance for the specific spot; and it is determined whether there exists an obstacle in the selected obstacle detection frames 42'.

As shown in FIG. 2, the scene understanding unit 21 further includes the detection frame selector 25 that selects obstacle detection frames 42' to be determined depending on the scheduled traveling route 51 from the obstacle detection frames 42' set in advance for each specific spot. The obstacle determination unit 26 determines whether there exists an obstacle in the obstacle detection frames 42' selected by the detection frame selector 25. This makes it possible to inhibit an increase in the arithmetic load on the obstacle determination unit 26.

Furthermore, the detection frame selector 25 may select close observation frames 48' to be determined depending on the scheduled traveling route 51 from the close observation frames 48 set in advance for each specific spot. In this case, the blind spot overlap determination unit 28 may determine whether a blind sport caused by an obstacle overlaps the close observation frames 48' selected by the detection frame selector 25. This makes it possible to inhibit an increase in the arithmetic load on the blind spot overlap determination unit 28.

FIGS. 9(*a*) to 9(*d*) show examples of the obstacle detection frame 42' to be selected by the detection frame selector 25. FIG. 9(*a*) shows examples of the obstacle detection frame 42' selected for a three-way junction with traffic lights. FIG. 9(*b*) shows examples of the obstacle detection frame 42' selected for a three-way junction without traffic lights. FIG. 9(*c*) shows examples of the obstacle detection frame 42' selected for a merging point. FIG. 9(*d*) shows examples of the obstacle detection frame 42' selected for a pedestrian crossing. FIGS. 9(*e*) and 9(*f*) show examples of the close observation frame 48' to be selected by the detection frame selector 25. FIG. 9(*e*) shows examples of the close observation frame 48' selected for a four-way junction with traffic lights. FIG. 9(*f*) shows examples of the close observation frame 48' selected for a four-way junction without traffic lights.

The selection method will be described using a three-way junction as an example. First of all, the obstacle detection frame 42' on the scheduled traveling route 51 of the host vehicle 46 is selected. The obstacle detection frame 42' on the opposing lane crossing the scheduled traveling route 51 of the host vehicle 46 is selected. In addition, the close observation frames 48' in contact with the selected obstacle detection frames 42' are selected. Thereby, the obstacle detection frames 42' and the close observation frames 48' related to the movement of the host vehicle 46 can be selected. The above selection method is also applicable to the other specific spots such as a merging point and a pedestrian crossing.

Referring to FIG. 3, descriptions will be provided for examples of the scene understanding method and the driving assistance method using the driving assistance apparatus 1*a* including the scene understanding device of the first embodiment.

In step S01, the map obtaining unit 23 obtains the map data where one, two or more obstacle detection frames 42 for detecting an obstacle are set in advance for the specific spots. Incidentally, as for the timing of reading the obstacle detection frames 42, the configuration may be such that each time the vehicle approaches a specific spot, the map obtaining unit 23 reads the obstacle detection frames 42 set for the specific spot which the vehicle is approaching. Proceeding to step S03, the route calculator 24 calculates the scheduled traveling route 51 of the host vehicle 46 based on information on the position and destination of the host vehicle 46. In step S05, the obstacle determination unit 26 obtains information on the obstacles around the vehicle which are detected by the vehicle-mounted camera 13 and the laser sensor 14. In step S07, the obstacle determination unit 26 obtains information on the attributes of the obstacles which are detected by the vehicle-mounted camera 13 and the laser sensor 14.

Proceeding to step S11, the blind spot overlap determination unit 28 calculates the blind spot ranges caused by the obstacles which are detected by the vehicle-mounted camera 13 and the laser sensor 14. Proceeding to step S13, the scene understanding unit 21 determines whether the nearest specific spot on the scheduled traveling route 51 is an intersection where three or more roads meet. Descriptions will be provided for a procedure for how to determine the specific spot as an intersection. A similar procedure is applicable to the other specific spots.

Proceeding to step S15, the detection frame selector 25 selects the obstacle detection frames 42' and the close observation frames 48' to be determined depending on the scheduled traveling route 51 from the obstacle detection frames 42 and the close observation frames 48 set in advance for the intersection. Proceeding to step S17, the blind spot overlap determination unit 28 determines whether the blind spots caused by the obstacles overlap the close observation frames 48'. Proceeding to step S19, the encoding processor 29 encodes the combinations of the obstacle detection frames 42 including the obstacles. Thereafter, the degree-of-risk calculator 27 reads data on the relationships between the encoded combinations and the degrees of risk from the degree-of-risk database 16.

Proceeding to step S21, the degree-of-risk calculator 27 compares the combinations encoded by the encoding processor 29 with the data on the relationships between the encoded combinations and the degrees of risk, and thereby calculates the degree of risk for the specific spot. In step S23, the degree-of-risk calculator 27 determines the driving assistance method depending on the calculated degree of risk, and outputs the determined driving assistance method to the driving assistance unit 22. Proceeding to step S25, the driving assistance unit 22 performs the driving assistance in accordance with the determined assistance method.

As discussed above, the following operation and effects can be obtained from the first embodiment of the present invention.

The scene understanding device calculates the degree of risk at each specific spot based on whether there exists an obstacle in the obstacle detection frames 42 which are set in the map data in advance, and which are shaped corresponding to the road structure. Thereby, obstacles which are detected at positions having nothing to do with the calculation of the degree of risk can be excluded from what the scene understanding device needs to process. This inhibits an excessive increase in the arithmetic load.

As shown in FIG. 6, the degree-of-risk calculator 27 calculates the degree of risk at each specific spot based on whether the close observation frames 48 to be closely observed by the host vehicle 46 overlap the blind spots 50 caused by the obstacles 49. This makes it possible to calculate the degree of risk at the specific spot on the assumption that obstacles exist in the blind spots 50.

The degree-of-risk calculator 27 calculates the degree of risk at each specific spot based on the combinations of the obstacle detection frames including the obstacles. Thus, the degree-of-risk calculator 27 need not calculate the degree of risk for each obstacle detection frame 42. This makes it possible to inhibit an excessive increase in the arithmetic load.

Using the degree-of-risk database 16, the degree-of-risk calculator 27 calculates the degree of risk at each specific spot from the encoded combinations of the obstacle detection frames. The encoding makes it possible to inhibit the increase in the arithmetic load more.

The obstacle determination unit 26 detects the attributes of the obstacles in the obstacle detection frames 42 at each specific spot on the scheduled traveling route 51, and the encoding processor 29 encodes the combinations of the obstacle detection frames including the obstacles and the attributes of the obstacles. Since the attributes (physical information and characteristic information) of the obstacles are taken into consideration, the accuracy of the calculation of the degree of risk is improved.

As shown in FIG. 9, the detection frame selector 25 selects the obstacle detection frames 42' to be determined depending on the scheduled traveling route 51 from the obstacle detection frames 42 set in advance for each specific spot. The obstacle determination unit 26 determines whether an obstacle exists in the obstacle detection frames 42' selected by the detection frame selector 25. Since the obstacle determination unit 26 makes the determination on only the obstacle detection frames 42' selected by the detection frame selector 25, it is possible to inhibit the increase in the arithmetic load more.

In the case where the specific spot is an intersection where three or more roads meet, the obstacle detection frame 42 is set for the entrance to, and the exit from, the intersection, the inside of the intersection, and the pedestrian crossings. This makes it possible to inhibit an excessive increase in the arithmetic road when the degree of risk is calculated for an intersection where three or more roads meet.

Second Embodiment

Figure 10:
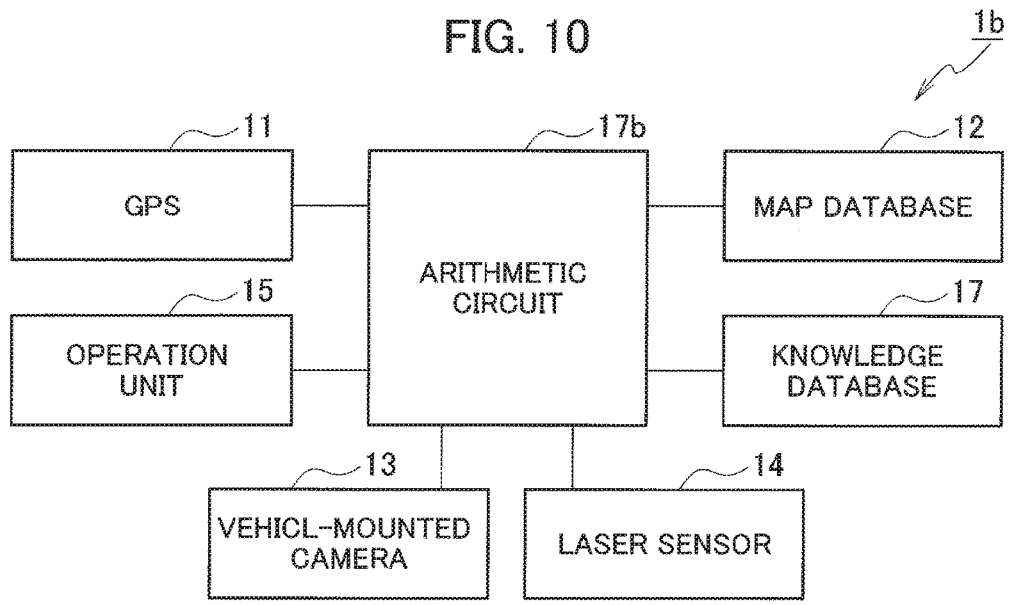
FIG. 10 is a block diagram showing an overall configuration of a driving assistance apparatus 1b including a scene understanding device of a second embodiment.
Figure 11:
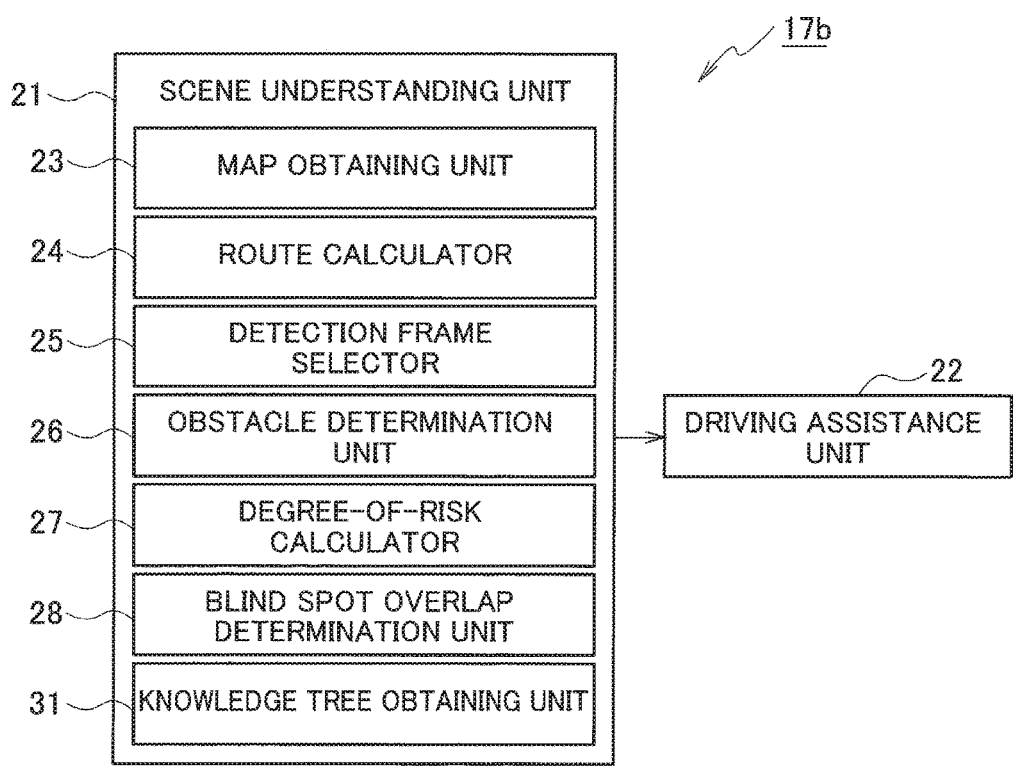
FIG. 11 is a block diagram showing multiple processing circuits configured by an arithmetic circuit 17b.

Referring to FIGS. 10 and 11, descriptions will be provided for a configuration of a driving assistance apparatus 1b including a scene understanding device of the second embodiment. The driving assistance apparatus 1b is different from the driving assistance apparatus shown in FIG. 1 in that the driving assistance apparatus 1b includes a knowledge database 17 instead of the degree-of-risk database 16. The knowledge database 17 stores data (knowledge tree) on: the obstacle detection frames 42 to be determined depending on the position of the host vehicle at each specific spot; and the order of the obstacle detection frames 42 to be cautious about. Examples of the position of the host vehicle at the specific spot include the entrance to, the inside of, and the exit from, the specific spot. The obstacle detection frames 42, and the order of the obstacle detection frames 42 to be cautious about are set for each of the entrance to, the inside of, and the exit from, the specific spot. It is a matter of course that the close observation frames 48 and the order of the close observation frames 48 to be cautious about may be set depending on the position of the host vehicle.

Referring to FIG. 11, descriptions will be provided for the multiple arithmetic processors configured by an arithmetic circuit 17b. The arithmetic circuit 17b is different from the arithmetic circuit 17a shown in FIG. 2 in that the arithmetic circuit 17b includes a knowledge tree obtaining unit 31 instead of the encoding processor 29 and the degree-of-risk data obtaining unit 30. The rest of the configuration of the arithmetic circuit 17b is the same as that of the arithmetic circuit 17a. The knowledge tree obtaining unit 31 obtains the data (knowledge tree) on the obstacle detection frames 42 and the order of the obstacle detection frames 42 to be cautious about, which are associated with the position of the host vehicle detected by the GPS 11, from the knowledge database 17. Based on the obstacle detection frames 42 and the order of the obstacle detection frames 42 to be cautious about which are obtained from the knowledge database 17, the obstacle determination unit 26 determines whether there exists an obstacle in the obstacle detection frames 42 sequentially. Thereby, depending on the position of the host vehicle at the specific spot, an appropriate degree of risk and an appropriate driving assistance method can be calculated.

Using an intersection as an example, descriptions will be provided for a method of calculating a degree of risk (a driving assistance method) using the knowledge tree. Areas (obstacle detection frames 42 and close observation frames 48) to be cautious about at each intersection, and the order of care taken to the multiple areas are set in the knowledge tree. The knowledge tree includes, for example, "intersection entrance information," "intersection exit information," "intersection inside information," and "blind spot information."

To put it specifically, the "intersection entrance information" is information on whether there exists another vehicle at or near the entrance to an intersection. The "intersection exit information" is information on whether there exists another vehicle at or near the exit from an intersection. The "intersection inside information" is information on whether there exists another vehicle inside the intersection. The "blind spot information" is information on whether a blind spot caused by another vehicle inside the intersection hides a close observation frame 48.

These sets of information are obtained in a predetermined order to determine a type of behavior of the vehicle, that is to say, the driving assistance method. Types of behavior includes "stop at the stop line" at the entrance to the intersection, "stop in the right-turn waiting area," "stop in front of the pedestrian crossing," "move at low speed to a place with better visibility, and accelerate or stop," and "go through the intersection within a vehicle speed limit." The use of the knowledge tree makes it possible to determine one from the speed control assistance methods.

The knowledge tree differs depending on the position of the host vehicle at each specific spot. Different knowledge trees are prepared respectively for a case where the host vehicle is in front of the entrance to the intersection, a case where the host vehicle is between the entrance to the intersection and the right-turn waiting area, and a case where the host vehicle is between the right-turn waiting area and the pedestrian crossing. These knowledge trees are stored in the knowledge database 17.

Figure 12:
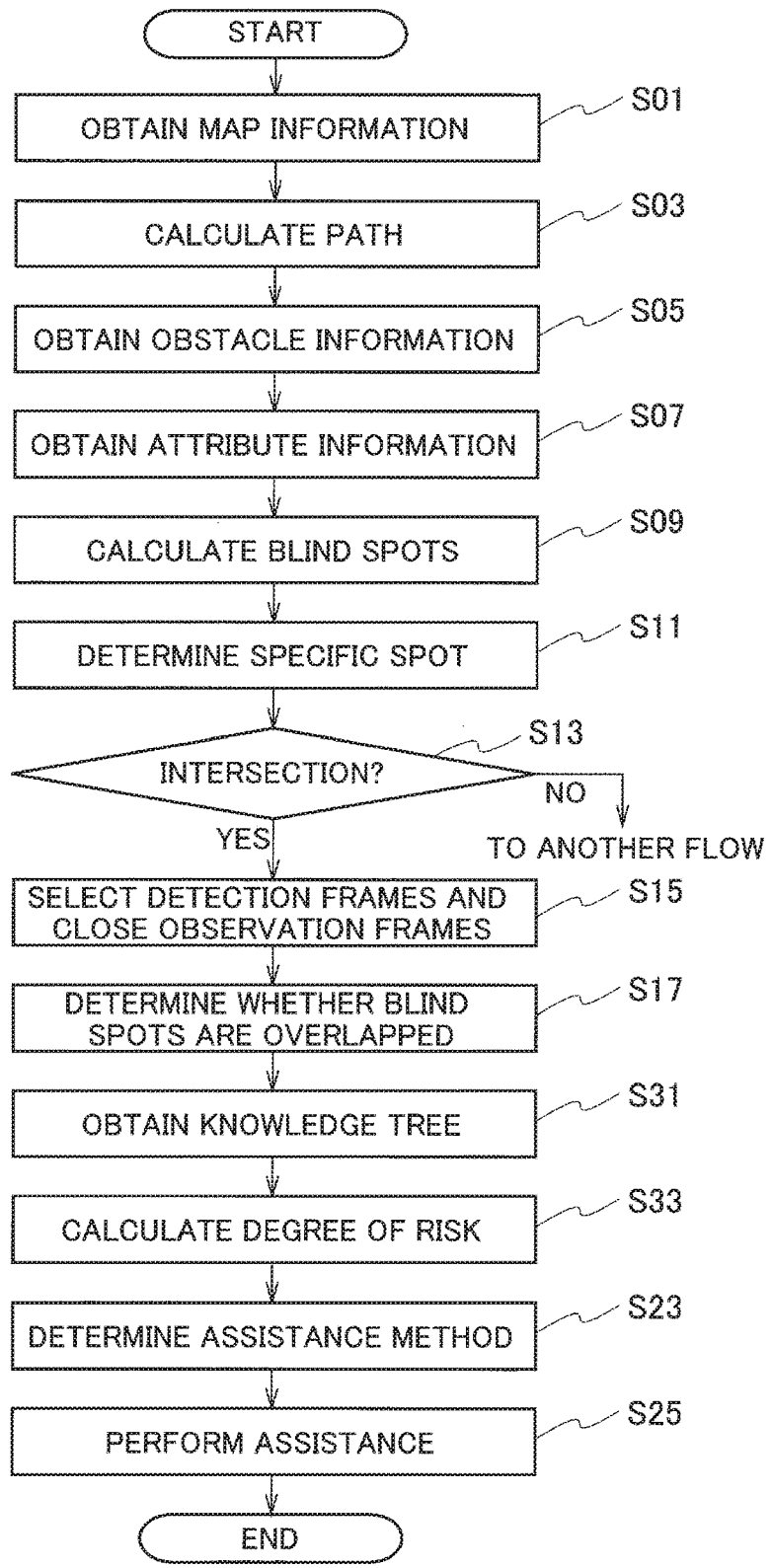
FIG. 12 is a flowchart showing an example of a driving assistance method including a scene understanding method of the second embodiment.

Using FIG. 12, descriptions will be provided for a scene understanding method and a driving assistance method using the driving assistance apparatus 1b including the scene understanding device of the second embodiment. Steps in FIG. 12 which are the same as those in FIG. 3 will be denoted by the same reference signs. Descriptions for such steps will be omitted.

The flowchart in FIG. 12 is different from that in FIG. 3 in that the flowchart in FIG. 12 includes step S31 (knowledge tree acquisition) and step S33 (degree of risk calculation) instead of step S19 (encoding, and degree-of-risk data acquisition) and step S21 (degree of risk calculation). The other steps in the flowchart in FIG. 12 are the same as those in the flowchart in FIG. 3.

In step S31, the knowledge tree obtaining unit 31 obtains the data (knowledge tree) on the obstacle detection frames 42, the close observation frames 48, as well as the order of the obstacle detection frames 42 and the close observation frames 48 to be cautious about, which are associated with the position of the host vehicle detected by the GPS 11, from the knowledge database 17.

Proceeding to step S33, the obstacle determination unit 26 determines whether there exists an obstacle in the obstacle detection frames 42 sequentially based on the knowledge tree obtained from the knowledge database 17. The degree-of-risk calculator 27 calculates the degree of risk at the specific spot, depending on whether there exists an obstacle. Proceeding to step S23, the degree-of-risk calculator 27 determines the driving assistance method corresponding to the calculated degree of risk, and outputs the determined driving assistance method to the driving assistance unit 22.

Figure 13:
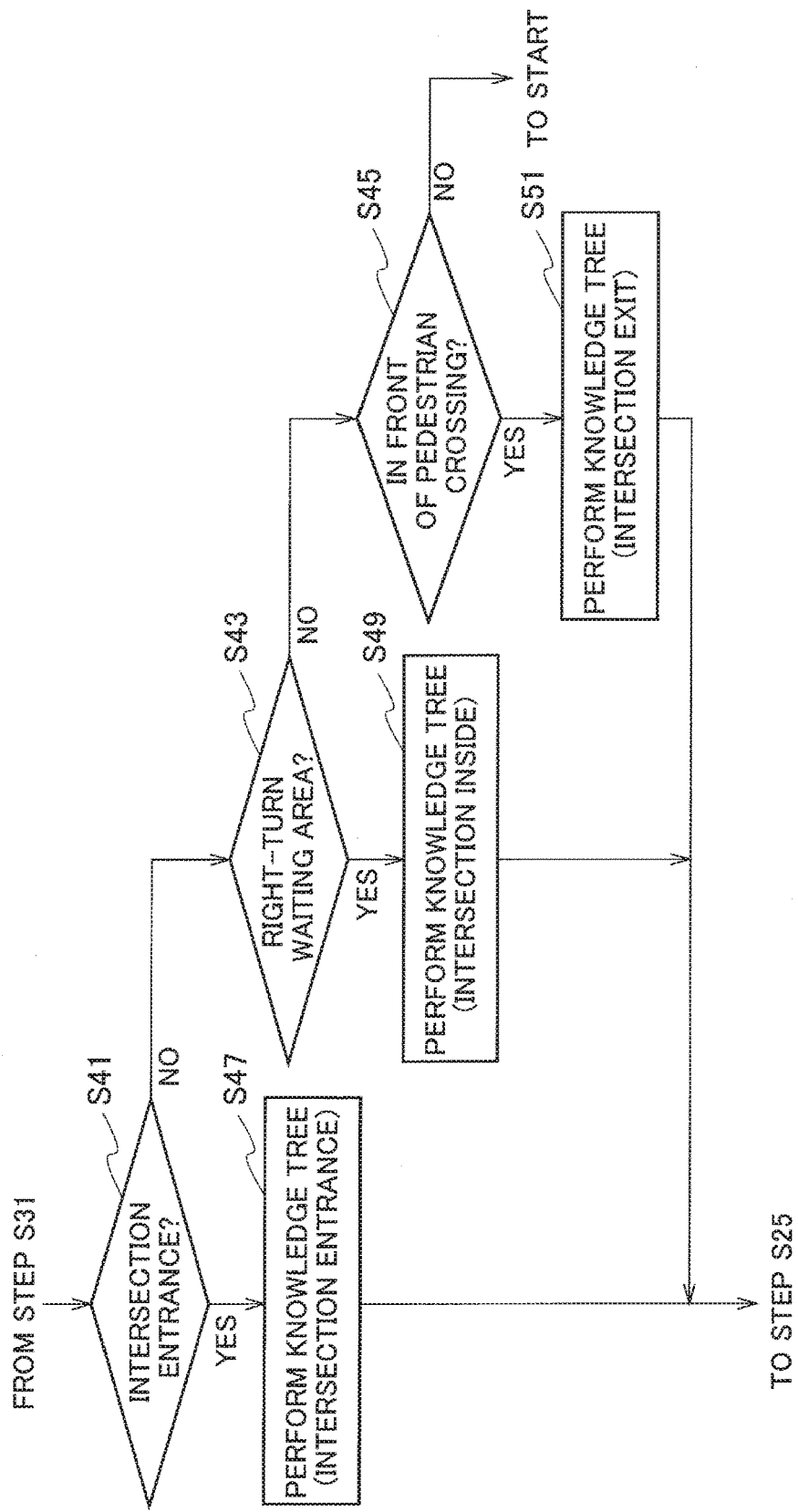
FIG. 13 is a flowchart showing a detailed procedure for steps S33 and S23 in FIG. 12.

Referring to FIG. 13, detailed descriptions will be provided for steps S33 and S23. In step S41, the obstacle determination unit 26 determines whether the position of the host vehicle detected by the GPS 11 is located in front of the entrance to the intersection. If the position thereof is located in front of the entrance to the intersection (YES in step S41), the process proceeds to step S47, where the knowledge tree (intersection entrance) associated with the entrance to the intersection is performed to calculate the degree of risk, and thereby to determines the driving assistance method. The details of the knowledge tree (intersection entrance) will be described later by referring to FIG. 14.

If the position of the host vehicle is not located in front of the entrance to the intersection (NO in step S41), the process proceeds to step S43, where it is determined whether the position of the host vehicle is located between the entrance to the intersection and the right-turn waiting area. If the determination is affirmative (YES in step S43), the process proceeds to step S49, where the knowledge tree (intersection inside) associated with the inside of the intersection is performed to calculate the degree of risk, and thereby to determines the driving assistance method. The details of the knowledge tree (intersection inside) will be described later by referring to FIG. 15.

If the determination is negative (NO in step S43), the process proceeds to step S45, where it is determined whether the position of the host vehicle is located between the right-turn waiting area and the front of the pedestrian crossing. If the determination is affirmative (YES in step S45), the process proceeds to step S51, where the knowledge tree (intersection exit) associated with the exit from the intersection is performed to calculate the degree of risk, and thereby to determine the driving assistance method. The details of the knowledge tree (intersection exit) will be described later by referring to FIG. 16.

Figure 14:
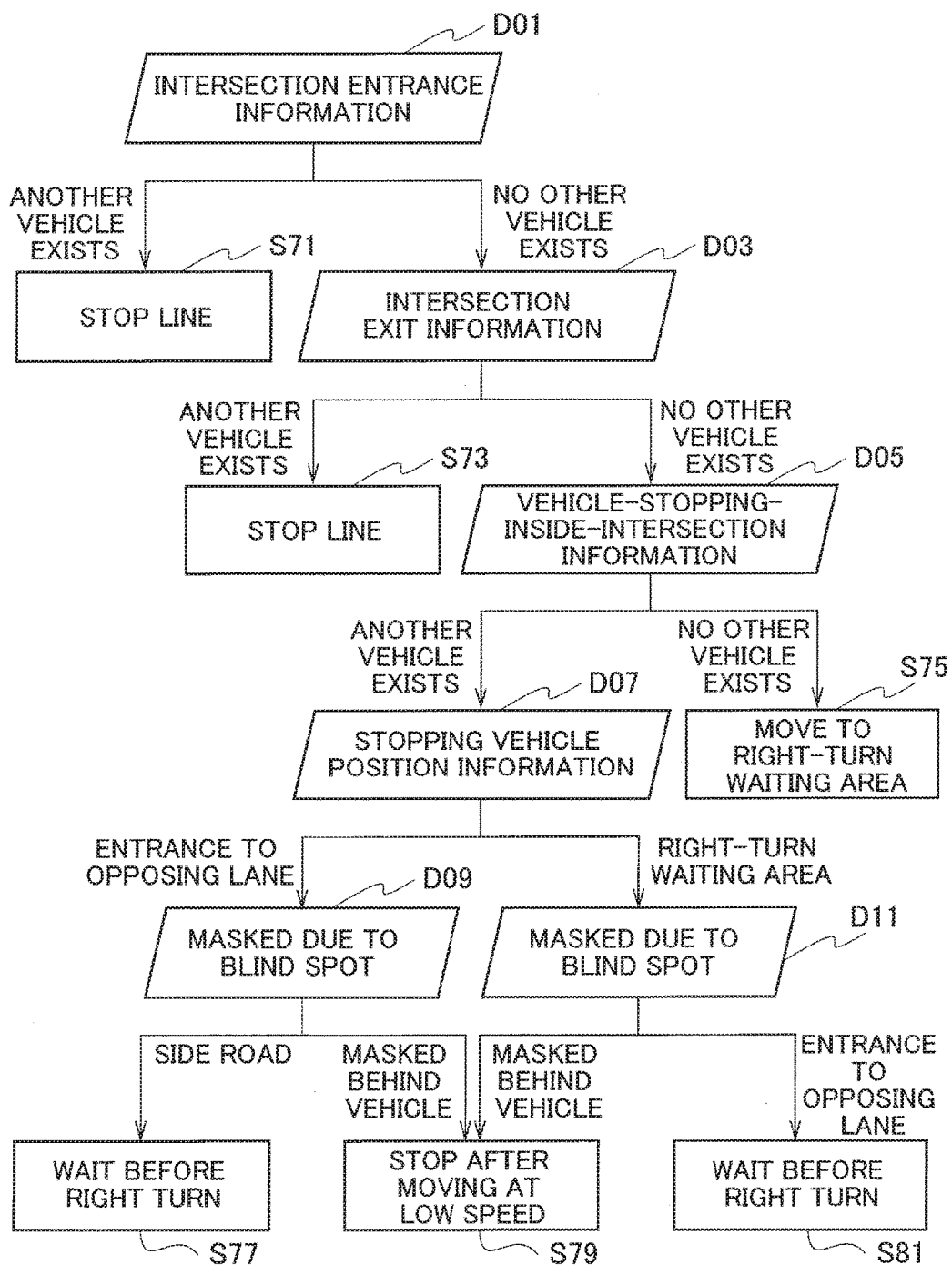
FIG. 14 is a flowchart showing a detailed procedure for a knowledge tree (for an entrance to a junction) shown for step S 47 in FIG. 13.

Referring to FIG. 14, descriptions will be provided for the detailed procedure for the knowledge tree (intersection entrance) shown for step S47 in FIG. 13. It is determined whether there exists another vehicle at or near the entrance to the intersection based on the above-mentioned "intersection entrance information D01." If another vehicle exists there, to stop at the stop line is determined as the behavior of the host vehicle (S71). If no other vehicle exists there, it is determined whether there exists another vehicle at or near the exit from the intersection based on the "intersection exit information D03." If another vehicle exists there, to stop at the stop line is determined as the behavior of the host vehicle (S73). If no other vehicle exists there, it is determined whether there exists another vehicle stopping inside the intersection based on "vehicle-stopping-intersection-inside information D05." If no other vehicle exists there, to move to the right-turn waiting area is determined as the behavior of the host vehicle (S75).

If another vehicle exists there, it is determined whether it is in the right-turn waiting area, or in or near the entrance to the opposing lane based on "stopping vehicle position information D07." If another vehicle is in the right-turn waiting area, and if a blind spot is formed at the entrance to the opposing lane by the vehicle, to move to the right-turn waiting area is determined as the behavior of the host vehicle (S81). If another vehicle is in the right-turn waiting area, and if a blind spot is formed behind the vehicle, to stop after moving at low speed is determined as the behavior of the host vehicle (S79). If another vehicle is at or near the entrance to the opposing lane, and if a blind spot is formed behind the vehicle, to stop after moving at low speed is determined as the behavior of the host vehicle (S79). If another vehicle is at or near the entrance to the opposing lane, if a bind spot is formed on the side road at the entrance to the opposing lane, to move to the right-turn waiting area is determined as the behavior of the host vehicle (S77).

Figure 15:
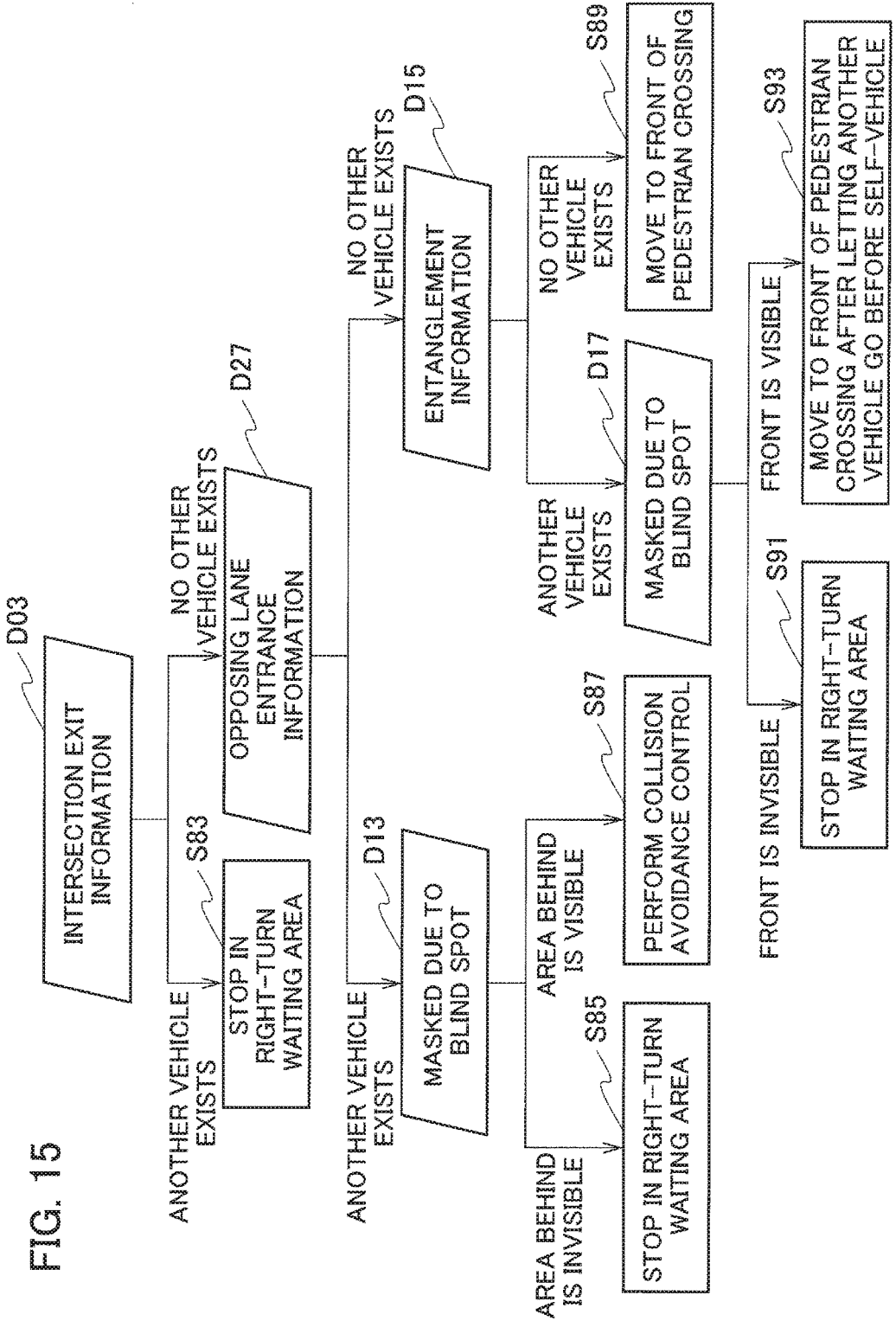
FIG. 15 is a flowchart showing a detailed procedure for a knowledge tree (for the inside of a junction) shown for step S 49 in FIG. 13.

Referring to FIG. 15, descriptions will be provided for the detailed procedure for the knowledge tree (intersection inside) shown for step S49 in FIG. 12. It is determined whether there exists another vehicle at or near the exit from the intersection based on the above-mentioned "intersection exit information D03." If another vehicle exists there, to stop in the right-turn waiting area is determined as the behavior of the host vehicle (S83). If no other vehicle exists there, it is determined whether there exists another vehicle at or near the entrance to the opposing lane based on "opposing lane entrance information S27." If another vehicle exists there, it is determined whether the area behind the vehicle is visible based on "blind spot information D13." If the area behind the vehicle is visible, to perform collision avoidance control is determined as the behavior of the host vehicle (S87). If the area behind the vehicle is not visible, to stop in the right-turn waiting area is determined as the behavior of the host vehicle (S85).

If no other vehicle exists at or near the entrance to the opposing lane, it is determined whether there exists a motorcycle which is going to turn right from inward of the back of the host vehicle based on "entanglement information D15." If no motorcycle exists there, to move to the front of the pedestrian crossing is determined as the behavior of the host vehicle (S89). If a motorcycle exists there, it is determined whether the front of the motorcycle is visible based on "blind spot information D17." If the front of the motorcycle is visible, to move to the front of the pedestrian crossing after letting the motorcycle overtake the host vehicle is determined as the behavior of the host vehicle (S93). If the front of the motorcycle is not visible, to stop in the right-turn waiting area is determined as the behavior of the host vehicle (S91).

Figure 16:
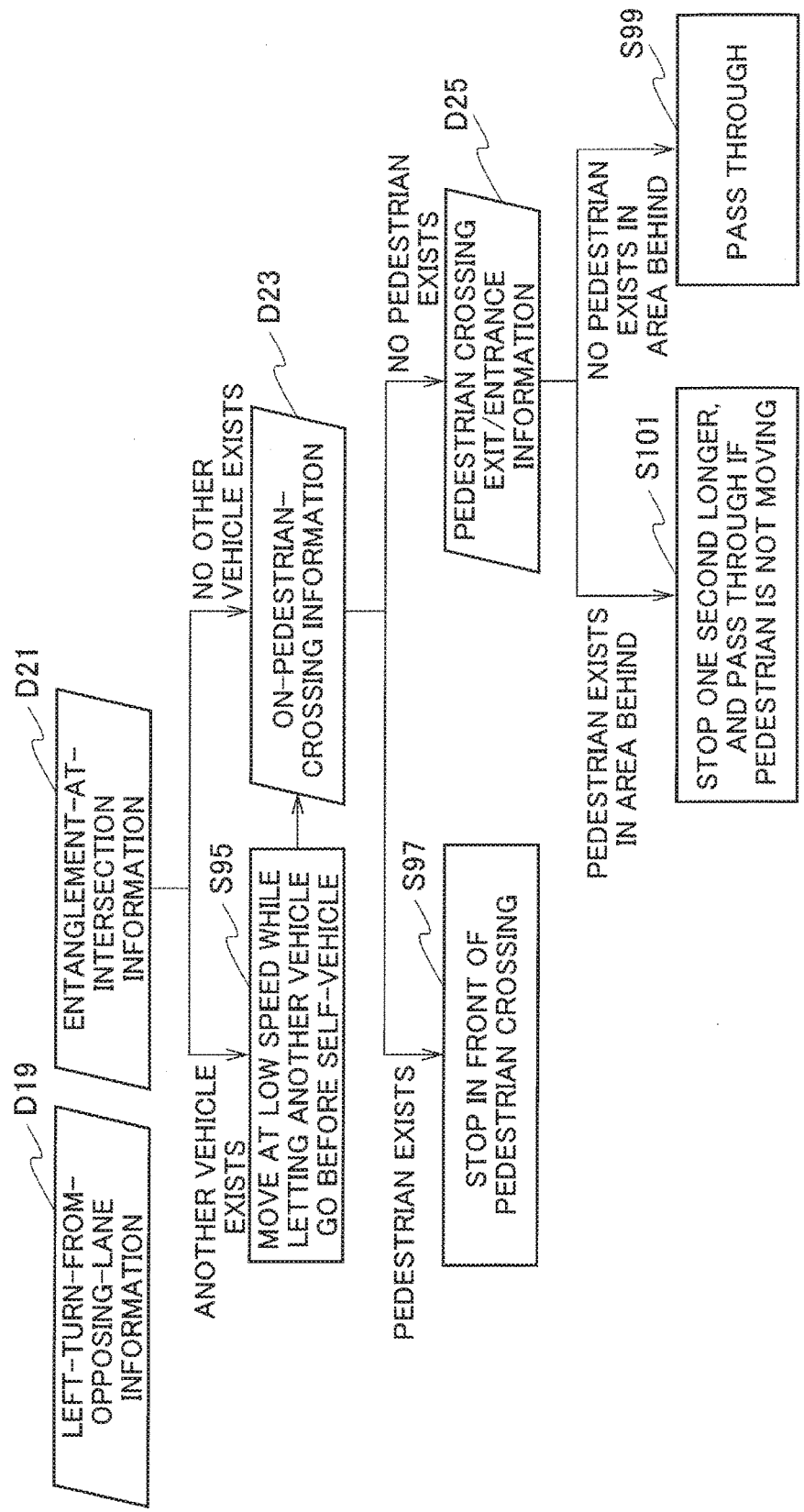
FIG. 16 is a flowchart showing a detailed procedure for a knowledge tree (for an exit from a junction) shown for step S 51 in FIG. 13.

Referring to FIG. 16, descriptions will be provided for the detailed procedure for the knowledge tree (intersection exit) shown for step S51 in FIG. 12. It is determined whether there exists another vehicle on the opposing lane which is going to turn left at the intersection, or whether there exists a motorcycle (another vehicle) which is going to turn right at the intersection from inward of the back of the host vehicle, based on "left-turn-from-opposing-lane information D19," or "entanglement-at-intersection information D21." If another vehicle exists there, to move at low speed while letting the vehicle go before the host vehicle is determined as the behavior of the host vehicle (S95). If no other vehicle exists there, it is determined whether there exists a pedestrian on the pedestrian crossing based on "pedestrian crossing information D23." If a pedestrian exists there, to stop in front of the pedestrian crossing is determined as the behavior of the host vehicle (S97). If no pedestrian exists there, it is determined whether there exists a pedestrian near the pedestrian crossing based on "pedestrian crossing exit/entrance information D25." If a pedestrian exists there, to stop one second longer and pass through the pedestrian crossing if the pedestrian is not moving is determined as the behavior of the host vehicle (S101). If no pedestrian exists there, to pass through the pedestrian crossing is determined as the behavior of the host vehicle (S99).

As discussed above, the following operation and effects can be obtained from the second embodiment of the present invention.

Referring to the knowledge database 17, the obstacle determination unit 26 determines whether there exists an obstacle in the obstacle detection frames 42 using the knowledge trees (FIGS. 14 to 16) corresponding to the position of the host vehicle. This makes it possible to calculate an appropriate degree of risk depending on the position of the host vehicle at each specific spot, and thereby to determine an appropriate vehicle behavior.

Although the embodiments of the present invention have been described above, the descriptions or drawings constituting part of this disclosure should not be understood as limiting the present invention. From the disclosure, various alternative embodiments, examples and operation techniques will be apparent to those skilled in the art.

REFERENCE SIGNS LIST 1a, 1b driving assistance apparatus
2 obstacle detection frame
12 map database
16 degree-of-risk database
17 knowledge database
21 scene understanding unit (scene understanding device)
23 map obtaining unit
24 route calculator (route obtaining unit)
25 detection frame selector
26 obstacle determination unit
27 degree-of-risk calculator
28 blind spot overlap determination unit
29 encoding processor
30 degree-of-risk data obtaining unit
31 knowledge tree obtaining unit
42, 42' obstacle detection frame
48, 48' close observation frame
49 obstacle
50 blind spot
46 host vehicle
51 scheduled traveling route
52 bike (obstacle)
53 pedestrian (obstacle)

The invention claimed is:

1. A scene understanding device that determines a degree of risk at a specific spot where a vehicle would otherwise bump into a vehicle or a pedestrian caused by crossed roads, comprising a computer programmed to:
obtain map data, on a scheduled traveling route, of a plurality of obstacle detection frames for detecting an obstacle, the plurality of obstacle detection frames set for both of the crossed roads in advance;
obtain route data on the scheduled traveling route of a host vehicle;
select a part of the obstacle detection frames to be determined depending on the scheduled traveling route from the plurality of obstacle detection frames set for the specific spot in advance;
determine whether there exists an obstacle in the selected part of the obstacle detection frames; and
calculate the degree of risk at the specific spot based on a result of determining whether an obstacle exists there.

2. The scene understanding device according to claim 1, wherein the computer is further programmed to:
obtain as additional map data a close observation frame which closely observes the specific spot, the close observation frame set for the specific spot in advance,
determine whether a blind spot caused by the obstacle overlaps the close observation frame, and
calculate the degree of risk at the specific spot based on a result of determining whether the blind spot overlaps the close observation frame.

3. The scene understanding device according to claim 1, wherein the plurality of obstacle detection frames is set for the specific spot, and the computer is further programmed to calculate the degree of risk at the specific spot based on a combination of obstacle detection frames including the obstacles, wherein the combination of obstacle detection frames including the obstacles is from the selected part of the obstacle detection frames.

4. The scene understanding device according to claim 3, further comprising:
a degree-of-risk database where the combination of obstacle detection frames including the obstacles is encoded, the computer programmed to store a relationship between the encoded combination and the degree of risk in the degree-of-risk database; and an encoding processor that encodes the combination of obstacle detection frames including the obstacles, wherein the computer is further programmed to calculate the degree of risk at the specific spot from the encoded combination using the degree-of-risk database.

5. The scene understanding device according to claim 4, wherein the computer is further programmed to detect attributes of the obstacles included in the combination of obstacle detection frames including the obstacles at the specific spot on the scheduled traveling route, and the encoding processor encodes the combination of obstacle detection frames including the obstacles with the attributes of the obstacles.

6. The scene understanding device according to claim 1, further comprising:

a knowledge database that stores the plurality of obstacle detection frames to be determined depending on a position of the host vehicle at the specific spot, and an order of the plurality of obstacle detection frames to be cautious about; and a sensor that detects the position of the host vehicle, wherein referring to the knowledge database, the computer is programmed to determine whether there exists an obstacle in the selected part of the obstacle detection frames sequentially, based on the position of the host vehicle.

7. The scene understanding device according to claim 1, wherein the specific spot is an intersection where three or more roads meet, and the plurality of obstacle detection frames are set for an entrance to, an exit from, and an inside of, the intersection, and a pedestrian crossing.

* * * * *